United States Patent [19]

Piesch et al.

[11] 4,451,620

[45] May 29, 1984

[54] DIETHANOLAMINE SALT OF SULPHAMIC ACID AS A CURING ACCELERATOR FOR AMINOPLAST RESINS

[75] Inventors: Steffen Piesch, Oberursel; Peter Dörries, Frankfurt am Main, both of Fed. Rep. of Germany

[73] Assignee: Cassella Aktiengesellschaft, Frankfurt am Main, Fed. Rep. of Germany

[21] Appl. No.: 491,723

[22] Filed: May 5, 1983

[30] Foreign Application Priority Data

May 14, 1982 [DE] Fed. Rep. of Germany ....... 3218231

[51] Int. Cl.³ .......................... C08G 6/00; C08L 61/02
[52] U.S. Cl. .................................... 525/398; 525/399; 525/456; 525/472; 525/473; 525/480; 525/483; 525/509; 528/230; 528/258; 528/259; 528/265

[58] Field of Search ............... 528/230, 258, 259, 265; 525/398, 399, 456, 472, 473, 480, 483, 509

[56] References Cited

U.S. PATENT DOCUMENTS 4,200,729 4/1980 Calbo ................................. 525/398
4,246,376 1/1981 Didomenico ....................... 525/398

FOREIGN PATENT DOCUMENTS 875945 8/1961 United Kingdom .
1027725 4/1966 United Kingdom .

*Primary Examiner*—Lucille M. Phynes
*Attorney, Agent, or Firm*—Connolly and Hutz

[57] ABSTRACT

Diethanolammonium sulphamate is a curing agent for modified aminoplast resins.

12 Claims, No Drawings

DIETHANOLAMINE SALT OF SULPHAMIC ACID AS A CURING ACCELERATOR FOR AMINOPLAST RESINS

The present invention relates to the use of di-(β-hydroxyethyl)-ammonium sulphamate (diethanolamine sulphamate) as a curing accelerator in the processing of aminoplast resins.

Aminoplast resins as defined in the invention are mono-molecular or low-molecular products from the condensation reaction—also frequently known as aminoplast precondensates—of a component containing amino, imino or amide groups, a so-called aminoplast precursor, with a carbonyl compound and, if appropriate, a lower alkanol (compare Ullmanns Enzyklopädie der technischen Chemie ["Ullmann's Encyclopaedia of Industrial Chemistry"], 4th edition, Volume 7 (1974), pages 403 to 424). Aminoplast precursors which are suitable for the preparation of aminoplast resins are: melamine, urea, dicyandiamide, thiourea, substituted melamines, acetoguanamine, butyroguanamine and ethyleneurea.

Aminoplast precursors which are preferred in industry for the preparation of aminoplast resins are melamine and urea.

Examples of carbonyl compounds which can be employed for the reaction with the above aminoplast precursors are formaldehyde, acetaldehyde, isobutyraldehyde, acetone, methyl ethyl ketone and diethyl ketone, Formaldehyde is preferred in industry. The most important industrial aminoplasts are prepared by subjecting the said preferred components formaldehyde, urea and/or melamine to a condensation reaction. Aminoplast resins as defined in the present invention are also resins which are obtained by co-condensing modifying components or by subsequently adding modifying agents. Examples of known modifying agents are o/p-toluenesulphonamide, sulphamic acid and its salts, caprolactam, glucose, sorbitol, glycol, diethylene glycol, pentaerythritol, sucrose, methylenebisformamide, methylenebisacetamide, carbamates, such as, for example, methyl carbamate and methoxy ethyl carbamate, and salts of maleic acid or fumaramic acid.

In industry, aminoplast resins are processed further in a wide variety of ways.

For example, solutions of aminoplast impregnating resins are used to impregnate paper or fabric which is used for the production of decorative laminated plastic sheets or for coating wood fibre board.

For the production of compression moulding materials, the aminoplast precondensate is mixed with fillers, such as, for example, cellulose or wood flour. Mouldings of all kinds, such as, for example, casings, push-buttons, electrical switchgear and many other types, are produced from these compression moulding materials by compression moulding in heated moulds.

When aminoplasts are processed, the aminoplast precondensates, which are soluble and fusible, change into infusible and insoluble products. In the course of this process, which is known as curing, crosslinking takes place throughout the precondensates. Even at the high temperatures of processing, however, the rate of this crosslinking reaction is too low for industrial processes, and must, therefore, be accelerated by adding so-called curing agents, and it is customary in industry to accelerate the curing of aminoplast resins by adding acids or compounds which have an acid reaction and/or split off acid.

Curing agents which are particularly required in this connection are so-called latent curing agents, the addition of which to the aminoplast resin achieves, on the one hand, an adequate processing time at room temperature and, on the other hand, as short as possible a curing time at the processing temperatures of 100° to 170° C. In this connection, the curing agents should not exhibit a corrosive attack on the metallic materials of the processing moulds.

It is already known (European Patent Application No. 0,000,780) that amine salts, in particular alkanolamine salts of strong acids, are suitable as latent curing agents of this type. However, when they are added to aminoplast resins containing carbohydrates, they exhibit the disadvantage that yellowing takes place during curing.

The use of sulphamic acid, zinc sulphamate and triethanolammonium sulphamate as curing agents for aminoplast resins, in particular for thermoplastic moulding compositions, is also known from U.S. Pat. No. 3,487,048; U.S. Pat. No. 2,377,867; British Patent Specification No. 875,945 and British Patent Specification No. 1,027,725. Zinc sulphamate is, however, not suitable for aminoplast liquid resins owing to precipitation of resin. The triethanolamine salt of sulphamic acid only has a low activity as a curing agent.

The latent curing agents hitherto known exhibit, inter alia, the disadvantage that their activity still leaves something to be desired in the case of aminoplast resins, the properties of which have been adjusted to suit special technical requirements in use by adding modifying agents, in particular in the case of those which have been considerably elasticised.

It has now been found that the diethanolamine salt of sulphamic acid has an unexpectedly high activity as a curing agent and can, therefore, be employed very successfully as a curing accelerator in the further processing of aminoplast resins.

The present invention therefore relates to the use of di-(β-hydroxyethyl)-ammonium sulphamate (diethanolamine sulphamate) as a curing accelerator for aminoplast resins. Diethanolammonium sulphamate still exhibits a very good activity even in the case of aminoplast resins containing more than 3% by weight, relative to solid resin, of known modifying agents, in particular elasticising agents, such as, for example, diethylene glycol, caprolactam, sorbitol or p-toluenesulphonamide, and in this respect it is, surprisingly, considerably superior to triethanolammonium sulphamate, which is already known as a curing agent. The use of diethanolammonium sulphamate as a curing agent is particularly preferable for modified aminoplast resins which have an aminoplast precursor/formaldehyde ratio of 1:1.4 to 1:3.0, in particular 1:1.6 to 1:2.0, and which have been prepared on a basis of melamine and urea, in particular mixtures of melamine with up to 30% by weight of urea, and, preferably, melamine as the sole aminoplast precursor.

The curing agent to be used in accordance with the invention has a good activity and exhibits no yellowing phenomena when aminoplast resins containing carbohydrates are cured, and it has no corrosive properties.

When the diethanolamine salt of sulphamic acid is used in accordance with the invention, the advantages which have been mentioned manifest themselves even when this salt is combined with other known curing agents of the salt type, such as, for example, amine salts or ammonium salts of medium strong to strong mineral acids or carboxylic acids. The latent curing agent known from German Offenlegungsschrift No. 2,911,265 is particularly suitable for a combination of this type. In this respect, the resulting properties depend on the particular mixing ratio.

An advantage relating to technical performance of the use of diethanolamine sulphamate which should not be underestimated lies in the fact that this product is still liquid and handleable in a concentration of 95%. It is advantageous to add it in this form to the aminoplast precondensate to be cured. For special purposes, however, it is also possible to employ a corresponding amount of a fairly dilute solution in a solvent or diluent compatible with the resin, preferably a solution in lower alkanols and, in particular, in water.

As already stated above, it is also possible to increase, in accordance with the invention, the curing rate of specially modified aminoplast resins. It is, therefore, also possible to combine the addition, according to the invention, of diethanolamine sulphamate to an aminoplast resin with a subsequent modification. Thus the addition of known aminoplast resin plasticisers belonging to the categories of substances comprising polyhydric alcohols, sugars, carbonamides or sulphonamides to the curing agent to be used in accordance with the invention leads to advantages for the end products prepared therewith, particularly as regards elasticity and gloss. 100 to 500% by weight of known modifying agents can be added for this purpose to mixtures containing diethanolammonium sulphamate. In the case of solid modifying agents, an appropriate aqueous solution of the modifying agent can be admixed.

Suitable aminoplast resins, the curing of which can be accelerated by means of the additive according to the invention, are all the known types present in an aqueous or aqueous alco-holic solution, in particular those based on reaction products with formaldehyde of urea, melamine, dicyandiamide, guanamines and mixtures of these resins with one another and of these amino-plast resins with other resins, such as phenolic resins and water-soluble polymers. The addition, in accordance with the invention, of diethanolammonium sulphamate is of particular im-portance for the curing of melamine-formaldehyde resins.

The amount of curing agent required to accelerate curing adequately is 0.05 to 3% by weight, preferably 0.2 to 1.2% by weight, relative to the solid resin.

Aminoplast resins and mixtures of thermosetting plastics which contain aminoplast resins and which contain known modifying agents in an amount of at least 3% by weight relative to the weight of the solid resin and, if appropriate, solvents and diluents and also, if appropriate, customary curing accelerators, also form a subject of this invention, provided that they contain 0.05 to 3% by weight, preferably 0.2 to 1.2% by weight, of diethanolammonium sulphamate.

Preferred aminoplast resins according to the invention contain, as specified above, over 3% by weight, relative to solid resin, of one or more of the abovementioned modifying agents, in particular the preferred modifying agents. Furthermore, aminoplast resins according to the invention which are preferred are those which have been prepared on the basis of melamine and urea, in particular mixtures of melamine and up to 30% by weight of urea and, preferably, melamine as the sole aminoplast precursor.

The aminoplast resins according to the invention can be employed for all the fields of use hitherto known for these resins, for example as chipboard binders, impregnating resins for laminated plastic webs, wet-strength agents for paper, textile auxiliaries, binders for glass fibre fleeces, surface finishing agents and lacquers.

The resins according to the invention are cured in a customary manner by the application of heat. Thus it is possible, for example, using the resins according to the invention, to produce surface-coated wood-based materials or chipboard in the multi-daylight presses used for the manufacture of such products and also by the quick-cycling process and in modern twin-belt presses.

The following illustrative embodiments illustrate the use, according to the invention, of diethanolammonium sulphamate for accelerating the curing of a melamine-formaldehyde impregnating resin which has been greatly elasticised by modifying agents and of a commercially available urea-formaldehyde impregnating resin, mixed with the greatly elasticised melamine-formaldehyde resin. In addition, the examples illustrate the action of the most nearly comparable known curing accelerator, triethanolammonium sulphamate.

It will be seen that the diethanolammonium sulphamate to be employed in accordance with the invention effects a considerably higher acceleration of curing than does the known product.

USE EXAMPLE 1

0.2; 0.4; 0.6; 0.8 and 1.0% relative to 100% solid resin, of a 95% strength by weight aqueous solution of diethanolammonium sulphamate are added to a commercially available, greatly elasticised melamine-formaldehyde resin having a melamine-formaldehyde molar ratio of 1:1.7 and containing 7% by weight of diethylene glycol and 3% by weight of sorbitol as elasticising modifying agents, designated resin 1 in the table and present in a 50% strength aqueous solution, and the time taken to reach turbidity and to reach curing when immersed in a boiling water bath is determined. The reactivity of the resin to which curing agent has been added is also determined in a known manner in a sealed glass tube at 140° C.

A 50% strength by weight aqueous solution of triethanolammonium sulphamate, employed in quantities of 0.2, 0.4, 0.6, 0.8 and 1.0%, relative to 100% solid resin, is tested in the same way. The values found in the comparison tests are listed in the table which follows.

USE EXAMPLE 2

If the test is carried out as indicated in Use Example 1, but with a commercially available urea-formaldehyde impregnating resin (molar ratio 1:1.8) mixed with resin I (in the proportion of 50 parts by weight of elasticised 55% strength melamine-formaldehyde impregnating resin and 50 parts by weight of 55% strength urea-formaldehyde impregnating resin), the values listed under resin II in the table are achieved.

TABLE
Tests of effectiveness of curing agents

| Resin | Curing agent | Turbidity time and curing time at 100° C. | Turbidity time in the reactivity test at 140° C. |
|---|---|---|---|
| Example 1 | | | |
| Resin I | no additive | 170/210 min | — |
| Resin I | + 0.2% of diethanol-ammonium sulphamate | 12 mins/14 mins | 101 seconds |
| Resin I | + 0.4% of diethanol-ammonium sulphamate | 7 mins 20 secs./ 8 mins 50 secs. | 78 seconds |
| Resin I | + 0.6% of diethanol-ammonium sulphamate | 6 mins/7 mins 30 secs. | 70 seconds |
| Resin I | + 0.8% of diethanol-ammonium sulphamate | 5 mins/6 mins 10 secs. | 65 seconds |
| Resin I | + 1.0% of diethanol-ammonium sulphamate | 4 mins 40 secs./ 5 mins 40 secs. | 60 seconds |
| Resin I | + 0.2% of triethanol-ammonium sulphamate | 20 mins/25 mins | 140 seconds |
| Resin I | + 0.4% of triethanol-ammonium sulphamate | 15 mins/19 mins | 120 seconds |
| Resin I | + 0.6% of triethanol-ammonium sulphamate | 10 mins/14 mins | 115 seconds |
| Resin I | + 0.8% of triethanol-ammonium sulphamate | 9 mins/12 mins | 95 seconds |
| Resin I | + 1.0% of triethanol-ammonium sulphamate | 8 mins/10 mins | 90 seconds |
| Example 2 | | | |
| Resin II | no additive | 180 mins | not measurable |
| Resin II | + 0.2% of diethanol-ammonium sulphamate | 12 mins | |
| Resin II | + 0.4% of diethanol-ammonium sulphamate | 8 mins | |
| Resin II | + 0.6% of diethanol-ammonium sulphamate | 7 mins | |
| Resin II | + 0.8% of diethanol-ammonium sulphamate | 6 mins | |
| Resin II | + 1.0% of diethanol-ammonium sulphamate | 5 mins | |
| Resin II | + 0.2% of triethanol-ammonium sulphamate | 25 mins | |
| Resin II | + 0.4% of triethanol-ammonium sulphamate | 16 mins | |
| Resin II | + 0.6% of triethanol-ammonium sulphamate | 12 mins | |
| Resin II | + 0.8% of triethanol-ammonium sulphamate | 10 mins | |
| Resin II | + 1.0% of triethanol-ammonium sulphamate | 9 mins | |

The curing accelerators employed in the above comparison tests can be prepared as follows:

Diethanolammonium sulphamate:

27.5 kg of diethanolamine are initially taken and 27.5 kg of sulphamic acid are introduced at an internal temperature of 60° C. (which can be allowed to rise to 80°–100° C. during the reaction). A viscous solution is formed, which has no tendency to crystallise even after prolonged standing at 10° C. A sample dissolved in water in a 1:1 ratio is colourless and has a pH of 6.9 (+0.2). The viscous substance is used in this form as a curing agent for melamine resins.

Triethanolammonium sulphamate:

194 g of sulphamic acid are introduced into 300 g of triethanolamine under the same conditions as above. A clear "melt" which solidifies at 20° C. is obtained. It must be diluted with water to 50% strength in order to be handleable.

What is claimed is:

1. In the process for curing modified aminoplast resins containing at least 3% by weight, relative to solid resin, of a modifying agent and at least one latent curing agent by the application of heat, the improvement comprises said curing agent comprises diethanolammonium sulphamate.

2. The process according to claim 1 wherein the aminoplast resin has an aminoplast/formaldehyde ratio of 1:1.4 to 1:3.

3. The process according to claim 1 wherein the aminoplast resin comprises a melamine or urea resin.

4. The process according to claim 3 wherein the resin has an aminoplast/formaldehyde ratio of 1:1.4 to 1:3.

5. The process according to claim 1 wherein the amount of diethanolammonium sulphamate is 0.05 to 3% by weight of solid resin.

6. The process according to claim 5 wherein the aminoplast resin has an aminoplast/formaldehyde ratio of 1:1.4 to 1:3.

7. The process according to claim 5 wherein the aminoplast resin comprises a melamine or urea resin.

8. The process according to claim 7 wherein the aminoplast resin has an aminoplast/formaldehyde ratio of 1:1.4 to 1:3.

9. Modified aminoplast resin composition containing at least 3% by weight, relative to solid resin, of a modifying agent and 0.05 to 3% by weight, relative to solid resin, of diethanolammonium sulphamate.

10. Modified aminoplast composition according to claim 9 wherein the resin has an aminoplast/formaldehyde ratio of 1:1.4 to 1:3.

11. Modified aminoplast composition according to claim 10 wherein the resin is a melamine or urea resin.

12. Modified aminoplast composition according to claim 9 wherein the resin is a melamine or urea resin.

* * * * *